United States Patent [19]

Takagaki et al.

[11] Patent Number: 5,859,098
[45] Date of Patent: *Jan. 12, 1999

[54] WEATHER RESISTANT POLYACETAL COMPOSITION

[75] Inventors: Hitohisa Takagaki; Hiroshi Okuda, both of Shizuoka, Japan

[73] Assignee: Polyplastics Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 710,021

[22] Filed: Sep. 11, 1996

Related U.S. Application Data

[63] Continuation of Ser. No. 515,680, Apr. 26, 1990, which is a continuation of Ser. No. 762,973, Aug. 6, 1985, abandoned.

[30] Foreign Application Priority Data

Aug. 15, 1984 [JP] Japan .................................. 59-170258

[51] Int. Cl.$^6$ ............................. C08K 5/34; C08K 5/16; C08K 5/10
[52] U.S. Cl. ............................. 524/91; 524/99; 524/102; 524/198; 524/291; 524/310; 524/312; 524/313; 524/317; 524/338
[58] Field of Search ................................ 524/91, 99, 102, 524/198, 291, 310, 312, 313, 317, 338

[56] References Cited

U.S. PATENT DOCUMENTS

| | | | |
|---|---|---|---|
| 2,371,957 | 3/1945 | Derby | 524/315 |
| 3,840,494 | 10/1974 | Murayama et al. | 524/99 |
| 3,981,884 | 9/1976 | Wang et al. | 524/91 |
| 4,123,418 | 10/1978 | Gilg et al. | 524/91 |
| 4,274,986 | 6/1981 | Ikenaga et al. | 524/910 |
| 4,278,589 | 7/1981 | Dexter et al. | 524/91 |
| 4,315,848 | 2/1982 | Dexter et al. | 524/100 |
| 4,446,263 | 5/1984 | Bryant | 524/291 |
| 4,559,380 | 12/1985 | Kasuga et al. | 524/317 |
| 4,647,609 | 3/1987 | O'Brien | 524/317 |
| 4,730,015 | 3/1988 | Ikenaga et al. | 524/291 |

FOREIGN PATENT DOCUMENTS

| | | | |
|---|---|---|---|
| 230163 | 9/1958 | Australia | 524/338 |
| 1230215 | 9/1964 | Germany . | |
| 3148768 | 6/1982 | Germany . | |
| 005934 | 1/1980 | Japan | 524/317 |
| 020056 | 1/1981 | Japan | 524/317 |
| 1398290 | 6/1975 | United Kingdom . | |

*Primary Examiner*—Kriellion S. Morgan
*Attorney, Agent, or Firm*—Burns, Doane, Swecker & Mathis, LLP

[57] ABSTRACT

A polyacetal resin composition comprises a polyacetal resin, (A) a light stabilizer selected from the group consisting of a benzotriazole compound, a benzophenone compound, an aromatic benzoate compound, a cyanoacrylate compound, and an anilide oxalate compound and (B) an aliphatic acid ester. It is improved in stability to weathing.

16 Claims, No Drawings

WEATHER RESISTANT POLYACETAL COMPOSITION

This application is a continuation of application Ser. No. 07/515,680, filed Apr. 26, 1990 which is a continuation of application Ser. No. 06/762,973, filed on Aug. 6, 1985, now abandoned.

The present invention relates to polyacetal resin compositions having excellent weathering properties. The invention is intended to provide a polyacetal resin composition suitable for use as a material for equipment parts in various fields of industry, such as electrical equipment, automobile, camera, computer, business machine, and sundries, and more particularly for equipment parts of which service durability is required under conditions involving exposure to sunlight or the atmosphere or exposure to relatively-high energy light rays, e.g., light rays from fluorescent lighting.

PRIOR ART

As is well known, polyacetal resins have recently become increasingly utilized as engineering resins in a very wide range of areas of application for their excellent physical properties, such as mechanical and electrical, and also for their excellent chemical properties, such as chemical resistance and heat resistance. As the range of areas of their application expands, however, there is a tendency that polyacetal resins used as such are required to have more specific characteristics.

As one aspect of such specific requirements, there are cases where improved weatherability is required. In the case of exterior automotive trims, electrical equipment parts, and business machine components, for example, there may occur color failure, loss of surface smoothness and luster, or deterioration in mechanical properties depending upon the conditions under which they are used, e.g., exposure to sunlight, fluorescent lighting, or to other atmospheric conditions. In an attempt to prevent these troubles it has been proposed to improve the weather (light) resistance of the polyacetal resin by adding various weathering (light) stabilizers thereto.

PROBLEM TO BE SOLVED BY THE INVENTION

Weathering (light) stabilizers proposed hitherto for thermoplastic resins include benzotriazole-based substances, benzophenone-based substances, aromatic benzoate-based substances, hindered amine-based substances, and anilide oxalate-based substances. It is known that these weathering stabilizers will prove to be effective when applied to polyacetals. Depending upon the purpose for which it is used, however, a molded part in which such stabilizer is used may not always satisfy the desired quality in respect of surface condition and mechanical characteristics. Indeed, products having greater weathering (light) stability are often required. However, an attempt to meet such requirement by merely increasing the loadings of weathering (light) stabilizers has its limitations in respect of weatherability improvement. Rather, such increased loadings may often have an undesirable effect on other characteristics of the product, and will naturally involve an economical disadvantage.

MEANS FOR SOLVING THE PROBLEM

The present inventors directed their strenuous efforts toward further improving the weathering (light) stability of polyacetal resins without detriment to their original good physical and chemical properties, and this led to the present invention.

A polyacetal resin composition according to the invention comprises a polyacetal resin, (A) a light stabilizer selected from the group consisting of a benzotriazole compound, a benzophenone compound, an aromatic benzoate compound, a cyanoacrylate compound, and an anilide oxalate compound and (B) an aliphatic acid ester.

It is preferable that the aliphatic acid ester has been obtained from an aliphatic acid and a polyhydric alcohol. It is more preferable that the aliphatic acid ester has been obtained from an aliphatic acid having 12 to 40 carbon atoms and a polyalkylene glycol having an average polymerization degree of 16 to 200.

In other words, the invention provides a weatherable polyacetal resin composition comprising a polyacetal resin and, by admixture therewith, (A) one or more kinds of weathering (light) stabilizers selected from the group consisting of benzotriazole-based substances, benzophenone-based substances, aromatic benzoate-based substances, cyanoacrylate-based substances, and anilide oxalate-based substances, and
(B) one or more kinds of fatty ester.

The polyacetal resin used in the invention may be a polyoxymethylene homopolymer, or a polyacetal copolymer or terpolymer in which a main chain consists largely of polyoxymethylene chains. There is no particular limitation as to the degree of polymerization or otherwise.

The ingredient (A) or weathering (light) stabilizer used in the invention is at least one kind of substance from the group consisting of benzotriazole-based substances, benzophenone-based substances, aromatic benzoate substances, cyanoacrylate-based substances, and anilide oxalate-based substances.

Loadings of such substance (relative to the composition as a whole) are normally 0.01~5% by weight, or preferably 0.05~2% by weight.

Examples of these substances are:
2-(2'-hydroxy-5'-methylphenyl) benzotriazole, 2-(2'-hydroxy-3',5'-di-t-butyl-phenyl) benzotriazole, 2-(2'-hydroxy-3',5'-di-isoamyl-phenyl) benzotriazole, 2-[2'-hydroxy-3',5'-bis-($\alpha,\alpha$-dimethylbenzyl) phenyl] benzotriazole, 2-(2'-hydroxy-4'-octoxyphenyl) benzotriazole, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxyberzophenone, 2,2'-dihydroxy-4,4'-methoxybenzophenone, 2-hydroxy-4-methoxy-5-sulfobenzophenone, 2-hydroxy-4-oxybenzylbenzophenone, p-t-butylphenyl salicylate, p-octylphenyl salicylate, 2-ethylhexyl-2-cyano-3,3'-diphenylacrylate, ethyl-2-cyano-3,3'-diphenylacrylate, N-(2-ethyl-phenyl)-N'-(2-ethoxy-5-t-butylphenyl) diamide oxalate, and N-(2-ethyl-phenyl)-N'-(2-ethoxyphenyl) diamide oxalate.

One component of a fatty ester used for the purpose of the invention is fatty acid, which component is one or more kinds of saturated or unsaturated fatty acid having two or more carbon atoms. Examples of such fatty acid are acetic acid, propionic acid, caproic acid, undecylic acid, pivalic acid, caprylic acid, lauric acid, tridecyl acid, myristic acid, pentadecylic acid, palmitic acid, heptadecylic acid, stearic acid, nonadecanoic acid, arachic acid, behenic acid, lignoserinic acid, cerotic acid, heptacosanic acid, montanic acid, melissic acid, lacseric acid, oleic acid, elaidic acid, linoleic acid, linolenic acid, arachidonic acid, and erucic acid. Preferably, they are fatty acids having twelve or more carbon atoms.

Another component used in the preparation of such fatty acid ester is polyvalent alcohol, for which component is used at least one kind of substance selected from the group consisting of homopolymers and copolymers of polyalkylene glycols, such as ethylene glycol, diethylene glycol, propylene glycols, glycerine, polyglycerine, trimethylpropane, pentaerythritol, sorbitan, polyethylene glycol, and polypropylene glycol. Examples of fatty esters thus obtainable are ethylene glycol distearate, glycerine monocaprinate, glycerine monostearate, glycerine tripalmitate, polyglycerine tristearate, trimethylolpropane monopalmitate, pentaerythritol monoundecylate, and sorbitan monostearate; also monolaurates, monopalmitates, monostearates, dilaurates, dipalmitates, distearates, dibehenates, dimontanates, dioleates, and dilinoleates of polyalkylene glycols, such as polyethylene glycol and polypropylene glycol.

Above all, esters of polyalkylene glycols having a mean polymerization degree of 16 or above and fatty acids having twelve or more carbon atoms are preferred. More specifically, esters of polyalkylene glycols having a mean polymerization degree of 20~200 are most suitable for use from the view point of surface configuration of molded parts.

In the present invention, the addition of fatty acid ester to the polyacetal resin is made within the range of 0.01% by weight to 30% by weight relative to the composition as a whole. A preferred range of addition is 0.05~10% by weight. If the addition is lower than this range, no sufficient weathering stability may be obtained. If the addition is higher than this range, it may lead to less favorable extrudability or less favorable mechanical properties. Therefore, a range of addition of 0.1% by weight to 5% by weight is most preferred.

In the present invention, it is desirable that one or more kinds of (C) hindered amine-based substances be incorporated into the composition of the invention in which said ingredient (A), i.e., weathering (light) stabilizer(s), and said ingredient (B), i.e., fatty ester, are present.

Said ingredient (C), hindered amine-based substance, is a piperidine derivative having sterically hindered groups. Examples of such substances are 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyoxy)-2,2,6,6-tetramethylpiperidine, bis(2,2,6,6-tetramethyl-4-piperidyl) oxalate, bis(2,2,6,6-tetramethyl-4-piperidyl) malonate, bis (2,2,6,6-tetramethyl-4-piperidyl) adipate, bis(2,2,6,6-tetramethyl-4-piperidyl) sebacate, bis(1,2,2,6,6-pentamethylpiperidyl) sebacate, bis(2,2,6,6-tetramethyl-4-piperidyl) terephthalate, 1,2-bis(2,2,6,6-tetramethyl-4-piperidyloxy) ethane, bis(2,2,6,6-tetramethyl-4-piperidyl) hexamethylene-1,6-dicarbamate, bis(1-methyl-2,2,6,6-tetramethyl-4-piperidyl) adipate, and tris(2,2,6,6-tetramethyl-4-piperidyl) benzene-1,3,5-tricarboxylate.

Also, high molecular-weight piperidine derivative polycondensation products, such as for example dimethyl succinate-1-(2-hydroxyethyl)-4-hydroxy-2,2,6,6-tetramethylpiperidine polycondensate, are effective for the purpose.

EFFECTS AND ADVANTAGES OF THE INVENTION

The invention relates to a composition comprising a polyacetal and, by admixture therewith, said ingredient (A), i.e., weathering (light) stabilizer(s), and said ingredient (B), i.e., fatty ester. Addition of a fatty ester to a system in which no weathering stabilizer is present does not result in improved weatherability, but will rather have an unfavorable effect in respect of weather resistance. Surprisingly, however, a composition incorporating both a weathering stabilizer(s) and a fatty ester(s) has, by virtue of a synergistic effect of the both ingredients, far much greater weathering (light) stability as compared with a polyacetal resin composition incorporating the weathering stabilizer(s) only. Further, it is less liable to deterioration in physical and mechanical properties, thermal stability and so on. Indeed, it has been found that parts molded of the composition of the invention exhibit remarkably improved performance against deterioration in surface configuration, e.g., change in color shade, luster, etc., crack initiation, and deterioration in mechanical properties, after their exposure to ultraviolet light, etc.

For the fatty ester component in the invention are used fatty esters of polyvalent alcohol in particular. More especially, such fatty esters composed of a polyalkylene glycol having a mean polymerization degree of 16 or more and a fatty acid having 12 or more carbon atoms are preferred from the viewpoint of their effect on the surface configuration of molded parts. More specifically, esters of polyalkylene glycol having a mean polymerization degree of 20~200 are most advantageously used from said viewpoint. As compared with other fatty esters, these fatty esters have much greater thermal stability and help dispersion of weathering stabilizers, since they have a high molecular weight of polyalkylene glycol. Further, they will allow the weathering stabilizer to bleed moderately for migration to the surface of a molded part, the resin being thereby prevented from deterioration. Thus, loss of surface luster and crack initiation on the molded part surface may be effectively prevented. Even if the molded part is left standing under high temperature and high humidity conditions, it has been found, the weathering agent will acceleratedly bleed to the surface in sufficient amount and without detriment to the appearance and functional characteristics of the part.

For reinforcement of thermal stability and/or other features, it is desirable to add other kinds of stabilizers to the polyacetal resin, a matrix of the composition of the invention. For this purpose, it is desirable to use, in combination, one or more kinds of known oxidation inhibitors, nitrogen compounds, alkaline compounds, or alkaline earth metal compounds.

The composition of the invention may be colored to any desired color by suitably adding different kinds of carbon blacks and/or other dyes and pigments.

The incorporation of weathering agents in accordance with the invention is not only effective in providing the resin material with weather resistance, but also it is very effective against fading or discoloration of various dyes and pigments added to the resin. In this respect, it is very effective for the purpose of maintaining the appearance and quality level of colored products.

Use of carbon blacks in combination with the weathering agents will contribute to further improvement in weathering (light) stability.

In order to impart to the composition of the invention any desired characteristics according to the purpose for which is ultimately used, it is also possible to incorporate thereinto one or more kinds of known additives, such as lubricant, nucleating agent, releasing agent, antistatic agent, other surface active agent, organic polymeric substance, or inorganic or organic fillers in fibrous, particulate, or lamellar form.

The composition of the invention may easily be prepared by any known method usually employed in preparing conventional resin compositions. For example, a method in which the ingredients are mixed together and then kneaded and extruded into pellets by an extruder, which pellets are subsequently molded into parts; or one wherein pellets of different compositions are first prepared, which pellets are then mixed in prescribed proportions for molding so that molded parts have a predetermined composition only after molding; or one such that one or more ingredients are directly charged into the molding machine. Any of these methods may be employed.

It is also possible to add individual ingredients only after they are supported by an organic polymeric substance or an inorganic substance which acts as a hold-back agent.

EXAMPLES

The invention is further illustrated by the following examples; it is understood, however, that the invention is not limited to these examples.

In the examples, the following procedures were followed for the purpose of evaluating measurements as to weatherability, etc.

1) Crack initiation time

Test pieces were subjected to irradiation by a weatherometer [model WBL-SUN-HCH, made by Suga Shikenki K. K.] under fade conditions at 83° C., and they were subsequently examined by a 5× magnifier for cracks on the surface. A period in which a first crack occurred was taken as crack initiation time. The greater the value, the better is the weather resistance.

2) Tensile strength and elongation

Tensile strength and elongation measurements were made of test pieces prior to irradiation and those after a specified period of irradiation, in accordance with a conventional method (ASTM-D638). "Unmeasurable" means that a test piece was conspicuously deteriorated and not available for normal measurement.

3) Change in surface condition

Changes in color shade and in luster between the pre-irradiation and post-irradiation states were observed and observations for both changes were evaluated respectively in five gradations. The smaller the value, the less was the change, i.e., less deterioration in color shade or in luster.

EXAMPLES 1~24 AND COMPARATIVE EXAMPLES 1~18

To a polyacetal resin [trade name "Juracon (M90)", produced by Polyplastics Co.] were added such weathering (light) stabilizer(s) and such fatty ester(s) as shown in Table 1. They were mixed in Henshell mixer. The mixture was then melt-kneaded by a monoaxial extruder into a pellet-form composition. Test pieces were molded from individual such compositions by employing an injection molder. They were tested for measurement of their weather resistance and other characteristics and the measurements were evaluated. For comparison purposes, compositions in which no weathering stabilizer or fatty ester is incorporated, and those incorporating only one of them were also prepared.

The measurement results are shown in Table 1. As is apparent from the results, compositions in which both weathering agent(s) and fatty ester(s) are compatibly present together have remarkable advantages, in crack initiation time, change in tensile strength and elongation, and surface condition, over those in which they are not present together or those in which none of them are present.

TABLE 1

| Example No. | | (A), (C) Stabilizer Substance | Addition | (B) Fatty eater Substance | Addition | Crack initiation time |
|---|---|---|---|---|---|---|
| EXAMPLE | 1 | A-1 | 0.25 | B-1 | 0.5 | 360 |
| | 2 | A-1 | 0.5 | B-1 | 0.5 | 420 |
| | 3 | A-1 | 1.0 | B-1 | 0.5 | 540 |
| | 4 | A-1 | 0.5 | B-1 | 2.0 | 420 |
| | 5 | A-1 | 0.5 | B-2 | 0.5 | 420 |
| | 6 | A-1 | 0.5 | B-3 | 0.5 | 360 |
| | 7 | A-1 | 0.5 | B-4 | 0.5 | 360 |
| | 8 | A-1 | 0.5 | B-5 | 0.5 | 420 |
| | 9 | A-1 | 0.5 | B-6 | 0.5 | 360 |
| | 10 | A-2 | 0.25 | B-1 | 0.5 | 360 |
| | 11 | A-2 | 0.5 | B-1 | 0.5 | 420 |
| | 12 | A-3 | 0.5 | B-1 | 0.5 | 420 |
| | 13 | A-4 | 0.5 | B-1 | 0.5 | 420 |
| | 14 | A-1 | 0.25 | B-1 | 0.25 | 600 |
| | | C-1 | 0.25 | | | |
| | 15 | A-1 | 0.5 | B-1 | 0.5 | 780 |
| | | C-1 | 0.5 | | | |
| | 16 | A-1 | 0.55 | B-1 | 2.0 | 840 |
| | | C-1 | 0.5 | | | |
| | 17 | A-1 | 0.5 | B-1 | 3.0 | 840 |
| | | C-1 | 0.5 | | | |
| | 18 | A-1 | 0.5 | B-5 | 0.5 | 780 |
| | | C-1 | 0.5 | | | |
| | 19 | A-1 | 0.5 | B-5 | 2.0 | 780 |
| | | C-1 | 0.5 | | | |
| | 20 | A-1 | 0.5 | B-6 | 0.5 | 720 |
| | | C-1 | 0.5 | | | |
| | 21 | A-1 | 0.5 | B-2 | 0.5 | 720 |
| | | C-1 | 0.5 | | | |

TABLE 1-continued

| | | | | | | |
|---|---|---|---|---|---|---|
| | 22 | A-1 | 0.5 | B-4 | 0.5 | 720 |
| | | C-1 | 0.5 | | | |
| | 23 | A-1 | 0.25 | B-1 | 0.5 | 540 |
| | | A-4 | 0.25 | | | |
| | 24 | A-4 | 0.5 | B-1 | 0.5 | 720 |
| | | C-1 | 0.5 | | | |

| | | Irradiation time, tensile strength/elongation | | | | | | Surface |
|---|---|---|---|---|---|---|---|---|
| | | 0 (hr) | | 600 (hr) | | 1000 (hr) | | |
| Example No. | | Strength (kg/cm$^2$) | Elongation (%) | Strength (kg/cm$^2$) | Elongation (%) | Strength (kg/cm$^2$) | Elongation (%) | condition (600 hr) |
| EXAMPLE | 1 | 627 | 67 | 618 | 26 | 548 | 15 | 2 |
| | 2 | 631 | 65 | 623 | 32 | 569 | 20 | 2 |
| | 3 | 625 | 62 | 624 | 34 | 590 | 23 | 2 |
| | 4 | 607 | 68 | 603 | 35 | 575 | 22 | 2 |
| | 5 | 624 | 71 | 621 | 28 | 564 | 18 | 2 |
| | 6 | 628 | 64 | 624 | 25 | 557 | 16 | 2 |
| | 7 | 625 | 63 | 620 | 26 | 563 | 15 | 2 |
| | 8 | 627 | 69 | 626 | 31 | 572 | 21 | 2 |
| | 9 | 622 | 64 | 621 | 26 | 561 | 16 | 2 |
| | 10 | 632 | 67 | 627 | 24 | 544 | 17 | 2 |
| | 11 | 627 | 66 | 622 | 28 | 565 | 18 | 2 |
| | 12 | 624 | 64 | 623 | 25 | 571 | 20 | 2 |
| | 13 | 626 | 69 | 621 | 27 | 568 | 20 | 2 |
| | 14 | 629 | 64 | 631 | 38 | 627 | 29 | 1 |
| | 15 | 622 | 73 | 625 | 45 | 622 | 38 | 1 |
| | 16 | 611 | 68 | 613 | 44 | 610 | 40 | 1 |
| | 17 | 608 | 74 | 610 | 48 | 612 | 43 | 1 |
| | 18 | 625 | 68 | 636 | 43 | 624 | 37 | 1 |
| | 19 | 609 | 70 | 628 | 45 | 628 | 40 | 1 |
| | 20 | 627 | 66 | 631 | 38 | 620 | 32 | 2 |
| | 21 | 632 | 70 | 628 | 39 | 625 | 33 | 2 |
| | 22 | 627 | 67 | 626 | 37 | 621 | 32 | 2 |
| | 23 | 626 | 66 | 620 | 35 | 592 | 24 | 1 |
| | 24 | 624 | 62 | 622 | 42 | 625 | 36 | 1 |

| | | Additive (wt. %) | | | | |
|---|---|---|---|---|---|---|
| | | (A), (C) Stabilizer | | (B) Fatty eater | | |
| Example No. | | Substance | Addition | Substance | Addition | Crack initiation time |
| COMPARATIVE EXAMPLE | 1 | — | — | — | — | 48 |
| | 2 | — | — | B-1 | 0.5 | 36 |
| | 3 | — | — | B-1 | 2.0 | 30 |
| | 4 | — | — | B-2 | 0.5 | 30 |
| | 5 | — | — | B-2 | 2.0 | 30 |
| | 6 | — | — | B-3 | 0.5 | 36 |
| | 7 | — | — | B-4 | 0.5 | 36 |
| | 8 | — | — | B-5 | 0.5 | 36 |
| | 9 | — | — | B-6 | 0.5 | 30 |
| | 10 | A-1 | 0.5 | — | — | 300 |
| | 11 | A-2 | 0.5 | — | — | 300 |
| | 12 | A-3 | 0.5 | — | — | 240 |
| | 13 | A-4 | 0.5 | — | — | 240 |
| | 14 | C-1 | 0.5 | — | — | 300 |
| | 15 | A-1 | 0.25 | — | — | 360 |
| | | C-1 | 0.25 | | | |
| | 16 | A-1 | 0.5 | — | — | 480 |
| | | C-1 | 0.5 | | | |
| | 17 | A-1 | 0.25 | — | — | 280 |
| | | A-4 | 0.25 | | | |
| | 18 | A-4 | 0.5 | — | — | 420 |
| | | C-1 | 0.5 | | | |

| | | Irradiation time, tensile strength/elongation | | | | | | Surface |
|---|---|---|---|---|---|---|---|---|
| | | 0 (hr) | | 600 (hr) | | 1000 (hr) | | |
| Example No. | | Strength (kg/cm$^2$) | Elongation (%) | Strength (kg/cm$^2$) | Elongation (%) | Strength (kg/cm$^2$) | Elongation (%) | condition (600 hr) |
| COMPARATIVE EXAMPLE | 1 | 639 | 74 | below 400 | below 5 | Measurement impossible | Measurement impossible | 5 |

TABLE 1-continued

| | | | | | | | |
|---|---|---|---|---|---|---|---|
| 2 | 622 | 67 | below 400 | below 5 | Measurement impossible | Measurement impossible | " |
| 3 | 602 | 71 | below 400 | below 5 | Measurement impossible | Measurement impossible | " |
| 4 | 625 | 70 | below 400 | below 5 | Measurement impossible | Measurement impossible | " |
| 5 | 605 | 67 | below 400 | below 5 | Measurement impossible | Measurement impossible | " |
| 6 | 620 | 68 | below 400 | below 5 | Measurement impossible | Measurement impossible | " |
| 7 | 618 | 63 | below 400 | below 5 | Measurement impossible | Measurement impossible | " |
| 8 | 603 | 64 | below 400 | below 5 | Measurement impossible | Measurement impossible | " |
| 9 | 617 | 65 | below 400 | below 5 | Measurement impossible | Measurement impossible | " |
| 10 | 640 | 62 | 625 | 21 | 525 | 16 | 3 |
| 11 | 639 | 60 | 620 | 20 | 524 | 13 | 4 |
| 12 | 634 | 64 | 567 | 16 | 496 | 14 | 4 |
| 13 | 637 | 63 | 573 | 17 | 502 | 12 | 4 |
| 14 | 633 | 64 | 605 | 18 | 515 | 14 | 4 |
| 15 | 635 | 64 | 625 | 24 | 538 | 17 | 2 |
| 16 | 638 | 63 | 610 | 20 | 567 | 18 | 2 |
| 17 | 640 | 63 | 610 | 20 | 510 | 14 | 3 |
| 18 | 639 | 64 | 625 | 27 | 562 | 18 | 2 |

Notes)
| | |
|---|---|
| Weathering stabilizer | Substance |
| A-1 | 2-[2'-hydroxyl-3',5'-di-t-amylphenyl] benzotriazole |
| A-2 | 2-[2'-hydroxy-5'-methylphenyl] benzotriazole |
| A-3 | N-(2-ethyl-phenyl)-N'-(2-ethoxy-phenyl) diamide oxalate |
| A-4 | 2-hydroxy-4-oxybenzyl benzophenone |
| Fatty ester | |
| B-1 | Polyethylene glycol monostearate: Nonion S-40 (polyethylene glycol mean polymerization degree: 90), produced by Nippon Oils & Fats Co., Ltd. |
| B-2 | Glycerine monostearate |
| B-3 | Glycerine tripalmitate |
| B-4 | Ethylene glycol distearate |
| B-5 | Polyethylene glycol monostearate: Nonion S-15.4 (polyethylene glycol mean polymerization degree: 35), produced by Nippon Oils & Fats Co., Ltd. |
| B-6 | Polyethylene glycol monostearate: Nonion S-4 (polyethylene glycol mean polymerizaton degree: 9), produced by Nippon Oils & Fats Co., Ltd. |
| Stabilizer | |
| C-1 | bis(2,2,6,6-tetramethyl-4-piperidyl) adipate |

The embodiments of the invention in which an exclusive property or privilege is claimed are defined as follows:

1. A polyacetal resin composition which comprises a polyacetal resin, (A) a light stabilizer present in an amount of 0.05–2 percent by weight, wherein said light stabilizer is a benzotriazole compound, (B) an aliphatic fatty acid ester obtained from a fatty acid and a polyalkylene glycol, wherein said aliphatic fatty acid ester is present in an amount of 0.1–5 percent by weight, and (C) a hindered amine which is a piperidine derivative, wherein said piperidine derivative is an adipate or sebacate derivative having sterically hindered groups, the combination of (A), (B) and (C) having a synergistic effect in terms of weathering stability.

2. A polyacetal resin composition as claimed in claim 1 wherein said polyacetal resin is a polyoxymethylene homopolymer or a polyacetal copolymer or terpolymer in which a main chain consists largely of polyoxymethylene chains.

3. A polyacetal resin composition as claimed in claim 1 wherein said benzotriazole compound is 2-(2'-hydroxy-5'-methylphenyl) benzotriazole, 2-(2'-hydroxy-3',5'-di-t-butylphenyl) benzotriazole, 2-(2'-hydroxy-3',5'-di-isoamyl-phenyl) benzotriazole, 2-[2'-hydroxy-3',5'-bis-(alpha,alpha-dimethylbenzyl) phenyl] benzotriazole, or 2-(2'-hydroxy-4'-octoxyphenyl) benzotriazole.

4. A polyacetal resin composition as claimed in claim 1 wherein said fatty acid is acetic acid, propionic acid, caproic acid, undecylic acid, pivalic acid, caprylic acid, lauric acid, tridecyl acid, myristic acid, pentadecylic acid, palmitic acid, heptadecylic acid, stearic acid, nonadecanoic acid, arachic acid, behenic acid, lignoserinic acid, cerotic acid, heptacosanic acid, montanic acid, melissic acid, lacseric acid, oleic acid, elaidic acid, linoleic acid, linolenic acid, arachidonic acid, or erucic acid.

5. A polyacetal resin composition as claimed in claim 1 wherein the hindered amine compound is a piperidine derivative having sterically hindered groups.

6. A polyacetal resin composition as claimed in claim 5 wherein said hindered amine compound is 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyoxy)-2,2,6,6-tetramethylpiperidine, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethylpiperidyl) sebacate, bis(2,2,6,6-tetramethyl-4-piperidyl) terephthalate, 1,2-bis(2,2,6,6-tetramethyl-4-piperidyloxy) ethane, bis(2,2,6,6-tetramethyl-4-piperidyl) hexamethylene-1,6-dicarbamate, bis(1-methyl-2,2,6,6-tetramethyl-4-piperidyl) adipate, or tris(2,2,6,6-tetramethyl-4-piperidyl) benzene-1,3,5-tricarboxylate.

7. A polyacetal resin composition as claimed in claim 6, wherein said benzotriazole compound is 2-(2'-hydroxy-5'-methylphenyl) benzotriazole, 2-(2'-hydroxy-3',5'-di-isoamyl-phenyl) benzotriazole, or 2-[2'-hydroxy-3',5'-bis-(alpha,alpha-dimethylbenzyl)phenyl] benzotriazole.

8. A polyacetal resin composition as claimed in claim 3, wherein said hindered amine compound is bis(2,2,6,6-tetramethyl-4-piperidyl) adipate, or bis(2,2,6,6-tetramethyl-4-piperidyl) sebacate.

9. The polyacetal resin composition as claimed in claim 7, wherein said benzotriazole compound is 2-(2'-hydroxy-5'-methylphenyl)benzotriazole.

10. The polyacetal resin composition as claimed in claim 7, wherein said benzotriazole compound is 2-(2'-hydroxy-3',5'-di-isoamyl-phenyl) benzotriazole.

11. The polyacetal resin composition as claimed in claim 7, wherein said benzotriazole compound is 2-[2'-hydroxy-3',5'-bis-(alpha,alpha-dimethylbenzyl)phenyl] benzotriazole.

12. The polyacetal resin composition as claimed in claim 8, wherein said hindered amine compound is bis(2,2,6,6-tetramethyl-4-piperidyl) adipate.

13. The polyacetal resin composition as claimed in claim 8, wherein said hindered amine compound is bis(2,2,6,6-tetramethyl-4-piperidyl) sebacate.

14. The polyacetal resin composition as claimed in claim 1, wherein the light stabilizer is present in an amount of 0.1–1 percent by weight.

15. The polyacetal resin composition as claimed in claim 1, wherein the hindered amine is present in an amount of from 0.25–0.5 percent by weight.

16. A polyacetal resin composition as claimed in claim 1, wherein the fatty acid has 12 to 40 carbon atoms and the polyalkylene glycol has an average polymerization degree of 16 to 200.

* * * * *